United States Patent
Pillonnet

(10) Patent No.: US 9,929,642 B2
(45) Date of Patent: Mar. 27, 2018

(54) DC/DC CONVERTER

(71) Applicant: Commissariat à l'Energie Atomique et aux Energies Alternatives, Paris (FR)

(72) Inventor: Gaël Pillonnet, Sassenage (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 88 days.

(21) Appl. No.: 15/077,380

(22) Filed: Mar. 22, 2016

(65) Prior Publication Data

US 2016/0285362 A1   Sep. 29, 2016

(30) Foreign Application Priority Data

Mar. 24, 2015 (FR) ...................................... 15 52451

(51) Int. Cl.
*G05F 1/10*   (2006.01)
*H02M 3/07*   (2006.01)
*H02M 1/32*   (2007.01)

(52) U.S. Cl.
CPC ............... *H02M 3/07* (2013.01); *H02M 1/32* (2013.01); *H02M 2001/325* (2013.01)

(58) Field of Classification Search
CPC ....... H01L 2924/00; H01L 2924/00014; H01L 2224/48465
See application file for complete search history.

(56) References Cited

U.S. PATENT DOCUMENTS

| 6,859,091 B1* | 2/2005 | Nicholson | H02M 3/07 327/536 |
| 2004/0046603 A1 | 3/2004 | Bedarida et al. | |
| 2008/0054990 A1* | 3/2008 | Shieh | H02M 3/07 327/536 |
| 2010/0188909 A1* | 7/2010 | Kenkare | G11C 11/419 365/189.16 |
| 2014/0029346 A1* | 1/2014 | Tanzawa | G11C 16/30 365/185.18 |
| 2014/0078797 A1 | 3/2014 | Mihalache | |

FOREIGN PATENT DOCUMENTS

FR   2835116 A1   7/2003

OTHER PUBLICATIONS

Search Report filed in FR 15/52451, dated Jan. 18, 2016, 2 pgs.

* cited by examiner

*Primary Examiner* — Sibin Chen
(74) *Attorney, Agent, or Firm* — Moreno IP Law LLC

(57) ABSTRACT

A DC/DC converter including: a plurality of conversion cells connected in parallel and/or in series, each cell including at least one switch and at least one passive power storage element; and a diagnosis circuit capable of individually testing the cells to detect possible defective cells, of deactivating the defective cells, and of storing the location of the defective cells.

12 Claims, 3 Drawing Sheets

DC/DC CONVERTER

This application claims the priority benefit of French patent application number 15/52451, filed on Mar. 24, 2015, the content of which is hereby incorporated by reference.

BACKGROUND

The present disclosure relates to the field of power supply circuits and, more generally, of DC/DC converters.

DISCUSSION OF THE RELATED ART

In many applications, for example, to power an electronic circuit, or a portion of an electronic circuit, it is necessary to convert a DC input voltage into a DC output voltage having a different level by means of a DC/DC converter.

DC/DC converters using switches or passive power storage elements, for example, capacitors or inductances, are here more specifically considered.

More particularly, multiple-cell DC/DC converters are here considered, that is, converters comprising a plurality of identical or similar conversion cells connected in parallel or in series between input terminals and output terminals of the converter.

There is a need for a multiple-cell DC/DC converter at least partly overcoming certain disadvantages of known multiple-cell DC/DC converters.

SUMMARY

Thus, an embodiment provides a DC/DC converter comprising: a plurality of conversion cells connected in parallel and/or in series, each cell comprising at least one switch and at least one passive power storage element; and a diagnosis circuit capable of individually testing the cells to detect possible defective cells, of deactivating the defective cells, and of storing the location of the defective cells.

According to an embodiment, to test a cell, the diagnosis circuit measures the cell output voltage and compares it with an expected output voltage.

According to an embodiment, to test a cell, the diagnosis circuit measures the conversion efficiency of the cell and compares it with an expected conversion efficiency.

According to an embodiment, to test a cell, the diagnosis circuit measures the output oscillation rate of the cell and compares it with an expected output oscillation rate.

According to an embodiment, each cell comprises an internal circuit for controlling said at least one switch of the cell, this circuit being rated by a clock signal provided by a circuit for generally controlling the converter.

According to an embodiment, the clock signals applied to the internal control circuits of the different cells are phase-shifted.

According to an embodiment, the general control circuit is capable, when defective cells are deactivated by the diagnosis circuit, of reconfiguring the phase shifts of the clock signals applied to the internal control circuits of the cells which are still active.

According to an embodiment, the diagnosis circuit comprises a non-volatile memory.

According to an embodiment, the power storage element is a capacitor or an inductance.

According to an embodiment, the switch is a MOS transistor.

According to an embodiment, each cell comprises a capacitive charge pump.

According to an embodiment, the cells and the diagnosis circuit are integrated in a same semiconductor chip.

The foregoing and other features and advantages will be discussed in detail in the following non-limiting description of specific embodiments in connection with the accompanying drawings.

DETAILED DESCRIPTION

Figure 1:
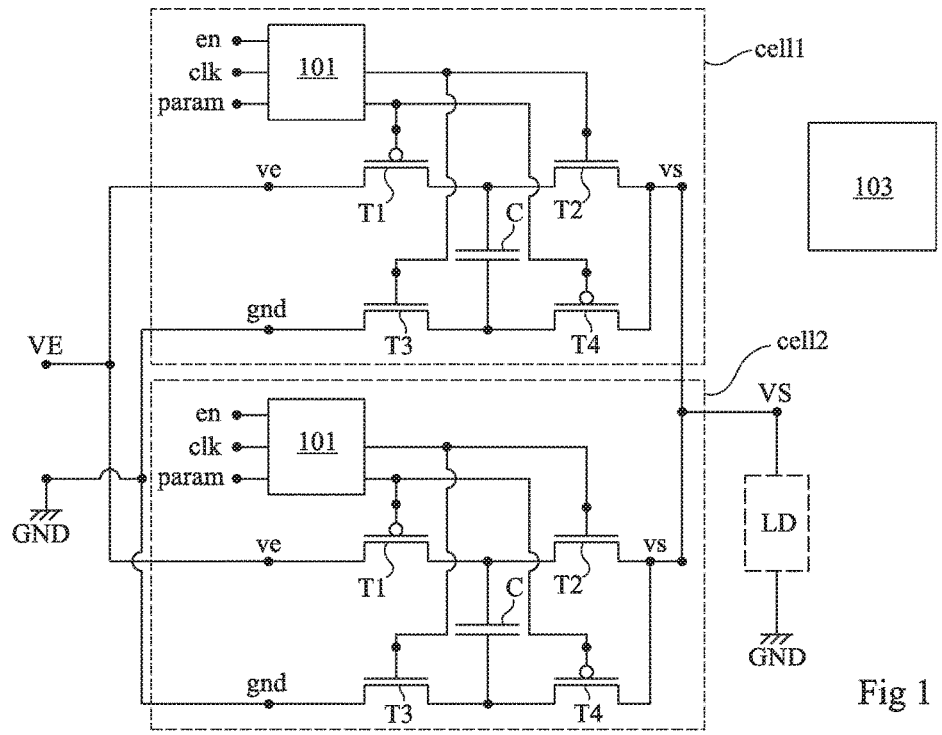
FIG. 1 is an electric diagram of an example of a multiple-cell DC/DC converter.

The same elements have been designated with the same reference numerals in the different drawings. For clarity, only those elements which are useful to the understanding of the described embodiments have been shown and are detailed. In particular, the control circuits used in multiple-cell DC/DC converters for controlling the different elementary conversion cells have not been detailed, the described embodiments being compatible with control circuits currently used in such converters. Unless otherwise specified, expressions "approximately", "substantially", and "in the order of" mean to within 10%, preferably to within 5%. Further, term "connected" designates a direct electric connection, with no intermediate electronic component, for example, by means of one or a plurality of conductive tracks, and term "coupled" or term "linked" designates either a direct electric connection (then meaning "connected") or a connection via one or a plurality of intermediate components (resistor, capacitor, etc.).

FIG. 1 is an electric diagram of an example of a multiple-cell DC/DC converter.

In the shown example, the converter comprises two identical or similar elementary DC/DC conversion cells cell1 and cell2, connected in parallel. In practice, the converter may comprise more than two elementary cells connected in parallel and/or in series, for example, from 10 to 100 elementary cells. The elementary cells are for example arranged in an array, in rows and columns.

In the example of FIG. 1, each elementary cell is a charge pump circuit capable of dividing an input voltage by a factor two.

Each elementary conversion cell comprises a node ve of application of an input voltage, a node vs for providing an output voltage, and a reference node gnd (the input voltage being applied between node ve and node gnd, and the output voltage being provided between node vs and node gnd).

The input nodes ve of all the converter cells are connected to a same node VE of application of a converter input voltage, the nodes vs of all the converter cells are connected to a same node VS for providing a converter output voltage, and the nodes gnd of all the converter cells are connected to a same reference node GND of the converter, for example, the ground. The converter input voltage is applied between nodes VE and GND, and the converter output voltage is provided between nodes VS and GND. A load LD to be powered may be connected between nodes VS and GND of the converter.

In the shown example, each elementary conversion cell comprises a first branch comprising two transistors T1 and T2 series-connected between nodes ve and vs, a second branch comprising two transistors T3 and T4 series-connected between nodes gnd and vs, and a capacitor C connecting the junction point of transistors T1 and T2 to the junction point of transistors T3 and T4. In the shown example, transistors T1 and T4 are P-channel MOS transistors, and transistors T2 and T3 are N-channel MOS transistors. The conduction nodes (source/drain) of transistor T1 are respectively coupled to node ve and to a first electrode of capacitor C, the conduction nodes of transistor T2 are respectively coupled to the first electrode of capacitor C and to node vs, the conduction nodes of transistor T3 are respectively coupled to node gnd and to the second electrode of capacitor C, and the conduction nodes of transistor T4 are respectively coupled to the second electrode of capacitor C and to node vs.

Each elementary conversion cell further comprises an internal control circuit 101 capable of controlling transistors T1, T2, T3, and T4. Transistors T1, T2, T3, and T4 are used as switches, that is, they may be controlled either to the on state, or to the off state. In the shown example, the control gates of transistors T1 and T4 are coupled to a same first output node of circuit 101, and the control gates of transistors T2 and T3 are coupled to a same second output node of circuit 101. Transistors T1 and T4 on the one hand, and T2 and T3 on the other hand, are thus simultaneously controlled to the off or on state.

Circuit 101 comprises a node en of application of a binary cell activation/deactivation signal. As an example, when the cell is controlled to the deactivated state via its node en, circuit 101 of the cell keeps the four transistors T1, T2, T3, and T4 of the cell in the off state, so that the cell no longer takes part in the converter output voltage supply.

Circuit 101 further comprises a node clk of application of a clock signal enabling to rate the charge transfers from the input to the output of the cell, via capacitor C.

Further, circuit 101 comprises an input param of application of a cell parameterizing signal, over one or a plurality of bits, particularly allowing a series and/or parallel connection between the different cells.

Nodes en, clk, and param of control circuits 101 of the different elementary conversion cells are coupled to a general control circuit 103 common to all the array cells.

In operation, each elementary cell of the converter may be alternately controlled by its control circuit 101 to a first state where transistors T1 and T4 are on and transistors T2 and T3 are off, and to a second state where transistors T2 and T3 are on and transistors T1 and T4 are off. The cell may be periodically controlled, alternately to the first state and to the second state, for example, with a duty cycle in the order of 0.5, at a frequency set by the clock signal applied to node clk of the cell. In steady state, the average output voltage provided by the cell is then substantially equal to half the cell input voltage.

The different converter cells for example receive the same clock signal, with a phase shift between two successive cells of the converter, for example, a phase shift in the order of $T_{clk}/N$, $T_{clk}$ being the period of the clock signal and N being the number of converter cells (N=2 in the simplified example shown in FIG. 1). The elementary converter cells are then controlled substantially in the same way, with a time shift between the phases of control of the different cells respectively to the first state and to the second state. An advantage of this control mode is that it enables to limit oscillations of the converter output voltage. The described embodiments are however not limited to this specific control mode. As a variation, the clock signals received by the different converter cells may be identical or in phase.

According to the needs of the application, general control circuit 103 may control the deactivation of certain cells (via their node en), for example, to limit the converter power consumption if the power required by the application does not require using all the elementary cells.

General control circuit 103 may further control the parameterizing of the cells (via their inputs param), for example, to modify the ratio of the input voltage to the output voltage, for example by varying the duty cycle between the phases of control of the cells respectively to the first state and to the second state and/or the switching frequency and/or the connections between the different cells.

A problem which may arise in a multiple-cell converter of the above-described type is that, in case of a failure of one or a plurality of elementary cells, for example, if the electrodes of the capacitor of an elementary cell are shorted as in the example of FIG. 1, malfunctions affecting the entire converter may occur. In particular, the performance of the converter, and particularly its efficiency, may be considerably decreased. A significant increase in the amplitude of the oscillations of the converter output voltage can thus be observed.

This problem specifically arises in the case where the elementary conversion cells are integrated on a same integrated circuit chip, for example, a chip formed inside and or on top of a silicon substrate. Indeed, in this case, the dielectric layer separating the two electrodes of capacitor C in each elementary cell may be relatively thin, for example, with a thickness between 1 and 10 nm. Capacitor C are then subject to manufacturing dispersions capable of resulting, in certain cases, in a short-circuit between electrodes. A defect in a single elementary cell may then make the entire converter unusable.

More generally, the embodiments described hereafter may be applied to any multiple-cell DC/DC converter, integrated or not, and comprising or not capacitors, where components of the elementary conversion cells (capacitors, inductances, transistors, etc.) are likely to malfunction.

According to an aspect of an embodiment, a multiple-cell DC/DC converter comprising a diagnosis circuit capable of individually testing the elementary conversion cells to detect possible defective cells, of deactivating the defective cells, and of storing the location of defective cells, is provided.

As an example, the diagnosis circuit is capable of successively testing the different elementary cells at the starting of the converter. As a variation or as a complement, the diagnosis circuit may test the different elementary cells during the converter operation, for example, during periodically-repeated diagnosis phases. The storage of the locations of the defective cells by the diagnosis circuit enables, each time the converter starts, to deactivate the cells which have been identified as defective, without having to test them again.

Figure 2:
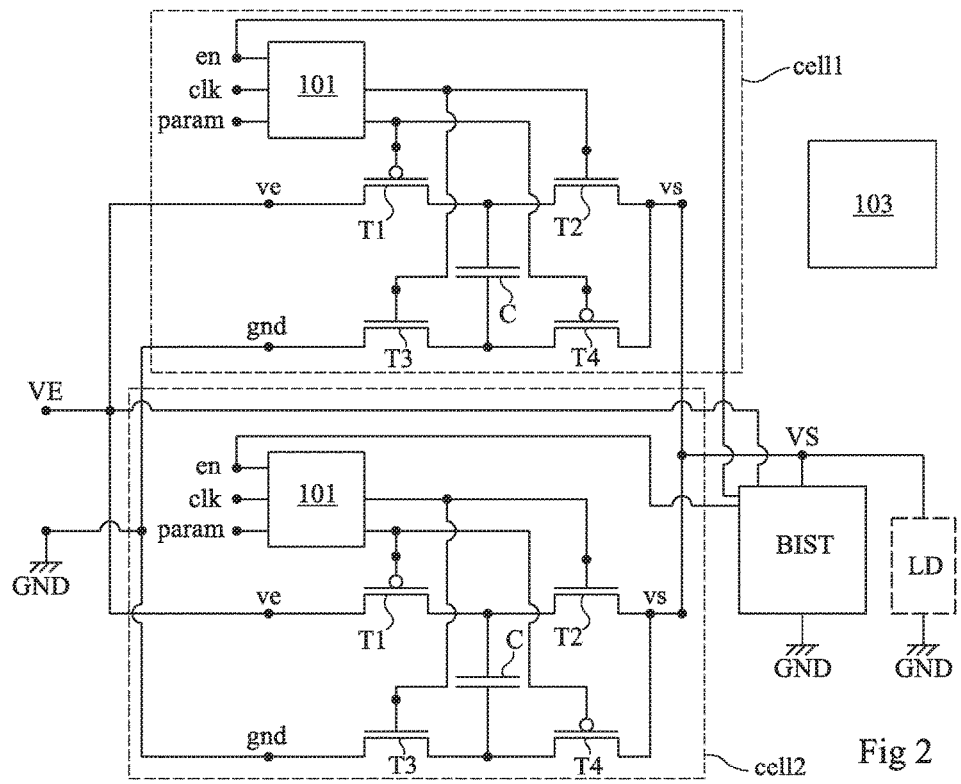
FIG. 2 is an electric diagram of an embodiment of a multiple-cell DC/DC converter.

FIG. 2 is an electric diagram of an embodiment of a multiple-cell DC/DC converter.

The converter of FIG. 2 comprises the same elements as the converter of FIG. 1, arranged substantially in the same way. These elements will not be detailed again.

The converter of FIG. 2 further comprises a BIST diagnosis circuit connected between terminals VS and GND of the converter, in parallel with load LD, and coupled to the different elementary conversion cells of the converter. Diagnosis circuit BIST is further connected to input terminal VE of the converter.

In the shown example, each elementary conversion cell has its activation/deactivation node en coupled to an output node of diagnosis circuit BIST. Thus, diagnosis circuit BIST is capable of individually activating/deactivating the different elementary converter cells.

During a phase of diagnosis of an elementary conversion cell, diagnosis circuit BIST may individually activate this cell via its activation/deactivation node en, and deactivate all the other cells of the DC/DC converter via their respective nodes en.

The diagnosis of the activated cell may for example comprise having the cell operate, and then verifying, in steady state, whether the ratio of output voltage VS to input voltage VE of the DC/DC converter effectively corresponds to the ratio expected for the cell, to within a tolerance margin. As an example, the diagnosis circuit may determine whether output VS of the converter is equal, to within more or less ten percents, to r*VE, where r is the theoretical conversion ratio of the tested cell. If it is, the cell may be considered healthy, and if it is not, the cell may be considered defective.

As a variation or as a complement, other health tests may be carried out to determine whether the cells are healthy or defective. As an example, diagnosis circuit BIST may implement a conversion efficiency measurement and/or a measurement of the oscillations of the converter output voltage, and determine whether the measured values are in accordance with the expected cell operation.

The elementary conversion cells may be tested sequentially, the state of each tested cell being recorded in a memory of diagnosis circuit BIST, preferably a non-volatile memory to be able to keep the cell state-of-health information when the DC/DC converter stops being powered.

At the end of the converter diagnosis phase, if defective cells have been identified, the cells may be deactivated via their control node en, the converter keeping on operating with the other cells.

According to an alternative embodiment, the converter diagnosis may be carried out by binary search for possible defective elementary cells. As an example, all the elementary cells of the inverter may, to begin with, be activated by the diagnosis circuit. The diagnosis circuit then determines whether the converter behaves as expected. If it does, the diagnosis circuit can consider that the activated elementary cells are healthy and interrupt the diagnosis. If it does not, the diagnosis circuit can deactivate half of the cells, and repeat the test. If the behavior of the activated cell is in accordance with the expected behavior, the diagnosis circuit can consider that the activated cells are healthy and that the defective cell(s) are located in the other half of the converter. By binary search, the diagnosis circuit can thus identify the defective cell(s) without having to individually test each of the cells.

When one or a plurality of defective cells are deactivated, the performance of the DC/DC converter may be slightly decreased with respect to a converter where all cells are healthy and active. The obtained performance however remains much greater than the performance obtained when cells are defective and are not activated. As an illustration, the inventors have carried out measurements for a DC/DC converter comprising 30 elementary cells of the type shown in FIGS. 1 and 2 and having, when all cells are healthy and activated, a 78% efficiency and a 0.3% output oscillation rate. In the absence of the diagnosis circuit of FIG. 2, the default (shorting) of a single elementary cells of the converter makes the conversion efficiency drop to 67%, and the output oscillation rate increase to 2.2%. The default of two elementary cells makes the conversion efficiency drop to 59% and the output oscillation rate increase to 4.3%. However, with the diagnosis circuit of FIG. 2 enabling to deactivate the defective cells, the efficiency only slightly decreases to 77% and the output oscillation rate slightly increases to 0.9% when one or two cells are defective.

Thus, the provided embodiment enables to keep on using, with no significant performance degradation, multiple-cell DC/DC converters having defective cells.

This embodiment is particularly advantageous in the case of a converter integrated inside and on top of a semiconductor chip, where it is impossible to repair or to replace a defective elementary cell. In this case, the BIST diagnosis circuit is for example integrated on the same semiconductor chip as the elementary cells and control circuit 103 of the converter.

In the case of a multiple-cell DC/DC converter where the different elementary conversion cells receive phase-shifted clock signals, it may be provided, when one or a plurality of elementary conversion cells are diagnosed as being defective and deactivated by diagnosis circuit BIST, to reconfigure the phase shifts of the clock signals applied to the remaining cells (healthy) to take into account the fact that cells have been deactivated. For example, general control circuit 103 may reconfigure the phase shifts so that the latter are substantially equally distributed, that is, so that the $N-N_{def}$ clock signals received by the $N-N_{def}$ cells which are still active (N being the total number of converter cells and $N_{def}$ being the number of deactivated defective cells) are phase-shifted two by two by approximately $T_{clk}/(N-N_{def})$, $T_{clk}$ (being the period of the clock signal. This advantageously enables to minimize the output oscillations of the converter.

During diagnosis phases, diagnosis circuit BIST may disconnect load LD intended to be powered by the converter, the cells being then tested off-load. As a variation, the cells may be tested by keeping load LD connected to the converter output. As a variation, diagnosis circuit BIST may comprise a diagnosis load (not shown), for example, a diagnosis resistor, connected between terminals VS and GND only during diagnosis phases (load LD may then be disconnected or kept connected). The provision of such a diagnosis load enables to more easily discriminate defective cells from healthy cells, particularly when the characteristics of load LD are not known with certainty.

Figure 3:
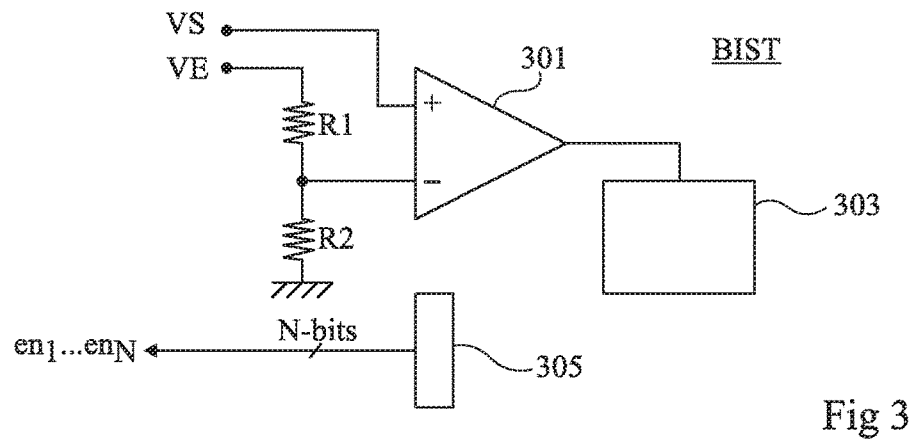
FIG. 3 is an electric diagram of an embodiment of a diagnosis circuit of the converter of FIG. 2.

FIG. 3 is an electric diagram of an embodiment of diagnosis circuit BIST of the converter of FIG. 2.

In the shown example, circuit BIST comprises a comparator 301 having a first input (+) coupled to terminal VS, and having a second input (−) coupled to the junction point of a voltage dividing bridge comprising two resistors R1 and R2 in series between terminal VE and terminal GND. Resistors R1 and R2 are selected so that the voltage applied to the second input (−) of comparator 301 is equal to r*(1−m)*VE, where r is the expected conversion ratio of an elementary conversion cell, and m is a tolerance margin, for example, in the order of 10%. Thus, if voltage VS is greater than voltage r*(1−m)*VE, the comparator output is in a first state, meaning that the tested cell is healthy, and if voltage VS is smaller than voltage r*(1−m)*VE, the comparator is in a second state, meaning that the tested cell is defective.

The output of comparator 301 is coupled to a storage circuit 303, for example comprising one memory location per elementary cell of the converter. Circuit 303 is capable of recording, for each tested cell, the result of the test in the memory location associated with the cell.

Circuit BIST further comprises a selection circuit 305 enabling to individually activate the different elementary conversion cells to test their output voltage.

In the example of FIG. 3, comparator 301 may advantageously be used outside diagnosis phases, to carry out other functions, for example, to implement a converter regulation function, comprising the control of one or a plurality of parameters of the converter with the voltage measured at the converter output.

Figure 4:
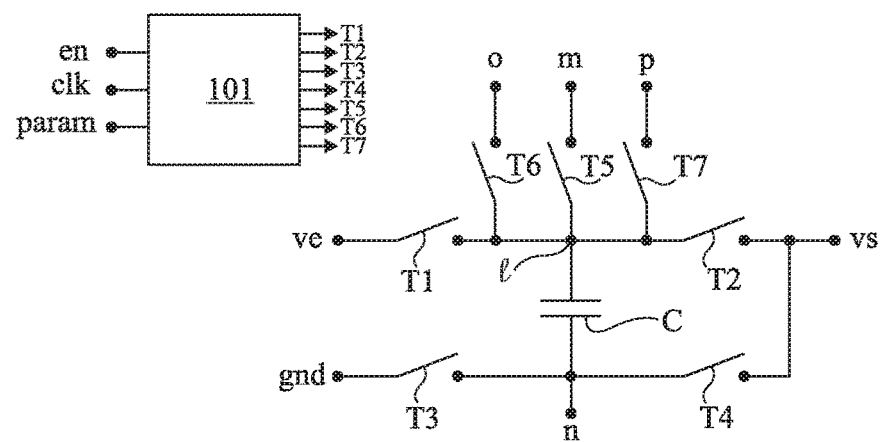
FIG. 4 is an electric diagram of an example of an elementary cell of a multiple-cell DC/DC converter according to an embodiment.

FIG. 4 is an electric diagram of another example of an elementary conversion cell of a multiple-cell DC/DC converter according to an embodiment.

The elementary cell of FIG. 4 comprises, as in the examples of FIGS. 1 and 2, a node ve of application of an input voltage, an output voltage provision node vs, a reference node gnd, a first branch comprising two switches T1 and T2 series-connected between nodes ve and vs, a second branch comprising two switches T3 and T4 series-connected between nodes gnd and vs, and a capacitor C connecting a common node 1 between switches T1 and T2 to a common node n between switches T3 and T4.

In the example of FIG. 4, the elementary cell further comprises a switch T5 connecting node 1 to a connection node m of the cell, a switch T6 connecting node 1 to a connection node o of the cell, and a switch T7 connecting node 1 to a connection node p of the cell. Switches T5, T6, T7 are for example MOS transistors.

The elementary conversion cell of FIG. 4 further comprises an internal control circuit 101 capable of controlling switches T1, T2, T3, T4, T5, T6, and T7 of the cell.

Circuit 101 comprises a node en of application of a binary cell activation/deactivation signal. As an example, when the cell is controlled to the deactivated state via its node en, circuit 101 of the cell keeps the seven switches T1, T2, T3, T4, T5, T6, T7 of the cell in the off state, so that the cell no longer takes part in the converter output voltage supply.

Circuit 101 further comprises a node clk of application of a clock signal enabling to rate the control of switches T1, T2, T3, T4, T5, T6, and T7 of the cell.

Further, circuit 101 comprises an input param of application of a signal for parameterizing the cell, over one or a plurality of bits, enabling to define the control sequence of switches T1, T2, T3, T4, T5, T6, T7 of the cell, particularly to parameterize the series and/or parallel connection mode between the different elementary cells of the converter and, possibly, the converter operating mode.

Figure 5:
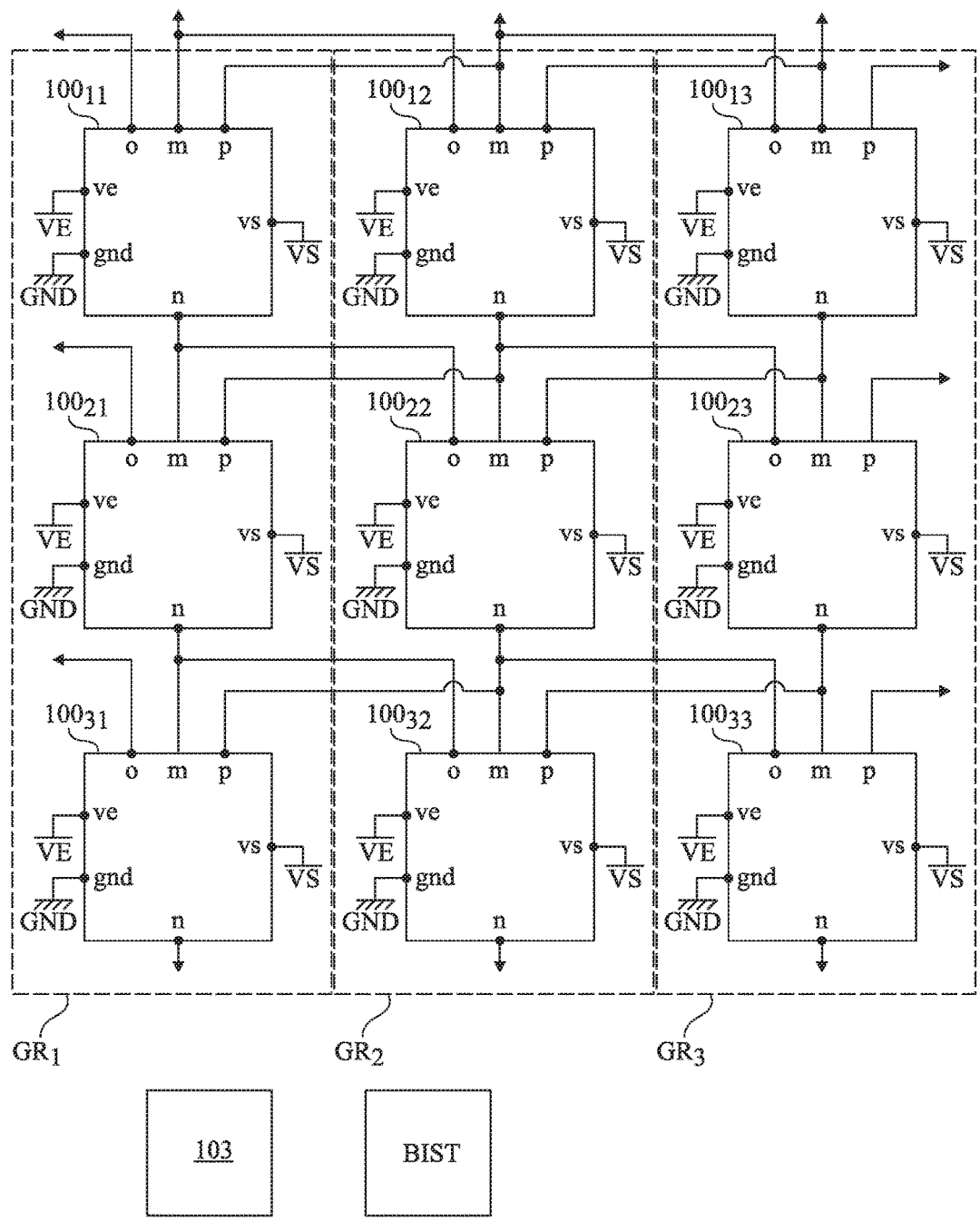
FIG. 5 is a simplified electric diagram of another embodiment of a multiple-cell DC/DC converter.

FIG. 5 is a simplified electric diagram of an embodiment of a multiple-cell DC/DC converter. The converter of FIG. 5 comprises a plurality of elementary conversion cells $100_{ij}$ identical or similar to the cell of FIG. 4. Cells $100_{ij}$ are arranged in an array of rows and columns, indexes i and j respectively designating the rank of the row and the rank of the column containing a cell, i being an integer varying from 1 to M and j being an integer varying from 1 to N, M and N being integers respectively designating the number of rows and the number of columns of the array of elementary cells. In the shown example, the converter comprises M=3 rows and N=3 columns. The described embodiments are however not limited to this specific case.

For simplification, elementary cells $100_{ij}$ are not detailed in FIG. 5. Only connection nodes ve, vs, gnd, m, n, o, and p of cells $100_{ij}$ are shown. In the example of FIG. 5, the elementary converter cells are all connected in parallel via their nodes ve, vs, and gnd. More particularly, the input nodes ve of all the converter cells are connected to a same node VE or application of an input voltage of the converter, the nodes vs of all the converter cells are connected to a same node VS for providing an output voltage of the converter, and the nodes gnd of all the converter cells are connected to a same reference node GND of the converter, for example, the ground. The converter input voltage is applied between nodes VE and GND, and the output voltage of the converter is provided between nodes VS and GND. A load to be powered (not shown in FIG. 5) may be connected between converter nodes VS and GND.

In the example of FIG. 5, neighboring elementary cells of the converter are further interconnected via their connection nodes m, n, o, and p. More particularly, each elementary cell $100_{ij}$ (except for the cells of the first row in the array) to its node m connected to node n of cell $100_{i-1j}$. Further, each elementary cell $100_{ij}$ (except for the cells of the first column in the array) has its node o connected to node m of cell $100_{ij-1}$. Further, each elementary cell $100_{ij}$ (except for the cells of the last column in the array) has its node p connected to node m of cell $100_{ij+1}$.

Nodes en, clk, and param (not shown in FIG. 5) of control circuits 101 of the different elementary conversion cells are coupled to a same general control circuit 103 common to all the array cells.

The different converter cells for example receive the same clock signal, with or without a phase shift between the different converter cells.

According to the needs of the application, general control circuit 103 may control the deactivation of certain cells (via their node en), for example, to limit the converter power consumption if the power required by the application does not require using all the elementary cells.

General control circuit 103 may further control the parameterizing of the cells (via their inputs param) according to the desired converter operating mode, for example, to modify the ratio of the input voltage to the output voltage of the converter by varying the modes of interconnection between the different cells.

According to a first operating mode, switches T5, T6, and T7 of the elementary cells are kept off and each active elementary cell of the converter is controlled by its control circuit 101 alternately to a first state where switches T1 and T4 are on and switches T2 and T3 are off, and to a second state where switches T1 and T4 are off and switches T2 and T3 are on. Each cell is for example periodically controlled, alternately to the first state and to the second state, for example, with a duty cycle in the order of 0.5, at a frequency set by the clock signal applied to node clk of the cell. The behavior of the converter is then similar to that of the converters of FIGS. 1 and 2. In steady state, the average output voltage delivered by the converter is substantially equal to half the converter input voltage.

According to a second operating mode, during at least one periodically-repeated converter operation phase, the active elementary cells of the converter are coupled in groups of at least two neighboring elementary cells via their switches T5, T6 and/or T7, to define a conversion ratio different from 0.5 between the output voltage and the input voltage of the converter.

As an illustration, elementary cells $100_{ij}$ are associated in groups of three successive elementary cells of the same column in the array. For example, in the converter of FIG. 5, elementary cells $100_{11}$, $100_{21}$, $100_{31}$ of the column of rank j=1, define a first group $GR_1$ of three connected cells, elementary cells $100_{12}$, $100_{22}$, $100_{32}$ of the column of rank j=2 define a second group $GR_2$ of three connected cells, and elementary cells $100_{13}$, $100_{23}$, $100_{33}$ of the column of rank j=3 define a third group $GR_3$ of three connected cells. In each group $GR_j$, switches T6 and T7 of the elementary cells in the group are kept off. Further, switch T5 of the elementary cell at position 1 in the group (that is, of rank i=1 in this example) is kept off. Each group $GR_j$ is controlled, via control circuits 101 of the elementary cells $100_{ij}$ in the group, alternately:

- to a first state where switches T1 of the cell at position 1 in the group, T5 of the cells at position 2 and 3 in the group (that is, of ranks i=2 and i=3 in this example), and T4 of the cell at position 3 in the group, are on, and switches T1 of the cells at position 2 and 3 in the group, T2 and T3 of the cells at position 1, 2, and 3 in the group, and T4 of the cells at position 1 and 2 in the group, are off; and
- to a second state where switches T2 and T3 of the cells at position 1, 2, and 3 in the group are on, and switches T5 of the cells at position 2 and 3 in the group, and T1 and T4 of the cells at position 1, 2, and 3 in the group, are off.

In other words, each group $GR_j$ is controlled, via control circuits 101 of the elementary cells $100_{ij}$ in the group, alternately to a first state where capacitors C of the cells in the group are series-connected between nodes VE and VS of the converter, and to a second state where capacitors C of the cells in the group are connected in parallel between nodes VS and GND of the converter.

Each group $GR_j$ is for example periodically controlled, alternately to the first state and to the second state, for example, with a duty cycle in the order of 0.5, at a frequency set by the clock signal applied to nodes clk of the cells in the group. In steady state, the average output voltage provided by the converter is then substantially equal to one quarter of the converter input voltage.

More generally, by varying the number of neighboring cells in each elementary group and the interconnection diagram of the cells of each elementary group in the first and second states, other conversion ratios between the input voltage and the output voltage of the converter can be obtained.

The converter operating mode may be parameterized by general control circuit 103 which generates, for each active elementary cell $100_{ij}$ of the converter, a parameterizing signal applied to input param of the cell. The parameterizing signal for example comprises one or a plurality of bits setting the desired conversion ratio and, possibly, the cell position in a group of neighboring cells cooperating to implement a determined conversion function. According to the parameterizing signal applied to its input param, the internal control circuit 101 of each elementary cell applies an appropriate control sequence to switches T1, T2, T3, T4, T5, T6, T7 of the cell.

The converter of FIG. 5 further comprises a diagnosis circuit BIST capable of individually testing elementary conversion cells $100_{ij}$ to detect possible defective cells. Diagnosis circuit BIST of FIG. 5 is for example identical or similar, in its layout and in its operation, to diagnosis circuit BIST of FIG. 2. In particular, circuit BIST is capable, at the end of a diagnosis phase, of deactivating defective cells and of storing their location.

According to the considered operating mode, if the defective cells are detected during a diagnosis phase, general control circuit 103 may, at the end of the diagnosis phase, modify the parameterizing of the remaining active cells to modify the control sequence of the switches of these cells.

In particular, as in the example of FIG. 2, if the different elementary conversion cells receive phase-shifted clock signals, it may be provided, when one or a plurality of elementary conversion cells are diagnosed as being defective and deactivated by diagnosis circuit BIST, to reconfigure the phase shifts between the control sequences applied to the remaining active cells (which amounts to modifying the control sequences applied to the switches of the remaining active cells) to take into account the fact that cells have been deactivated, especially to rebalance the phase shifts to minimize the converter output oscillations.

Further, when the elementary cells are coupled in elementary groups of a plurality of neighboring cells to implement a specific conversion function, such as for example in the second operating mode described hereabove in relation with FIG. 5, it may be provided, when elementary cells are diagnosed as being defective in a plurality of elementary groups and are deactivated by diagnosis circuit BIST, to modify the parameterizing of the remaining active cells, to recreate, when possible, one or a plurality of elementary groups from the remaining healthy cells in the defective groups. As an illustration, in the example of FIG. 5, if cells $100_{21}$ and $100_{12}$ are diagnosed as being defective, rather than entirely deactivating the two elementary groups $GR_1$ and $GR_2$ of the converter, it may be provided to reconfigure cells $100_{11}$, $100_{22}$, and $100_{31}$ into a new elementary group where, in the first state, the series connection of capacitors C of the cells in the group is performed via switch T6 of the cell at position 2 in the new group, that is, cell $100_{22}$, and, via switch T7 of the cell at position 3 in the new group, that is, cell $100_{31}$. In practice, this amounts to reconfiguring the control sequences applied to the switches of cells $100_{11}$, $100_{22}$, and $100_{31}$. Cells $100_{12}$, $100_{21}$, and $100_{32}$ may be deactivated. As an example, to select which cells to associate in a new elementary group during such a reconfiguration of the converter, general control circuit 103 may comprise a memory storing configuration tables enabling to identify, for each converter operating mode and for each elementary cell of the converter, the neighboring elementary cell(s) capable of being combined with the considered cell to form an elementary group capable of implementing the desired conversion function. As a variation, general control circuit 103 may comprise logic circuits capable of implementing an algorithm of search for neighboring healthy values capable of being combined in a new elementary group capable of implementing the desired conversion function.

Specific embodiments have been described. Various alterations, modifications, and improvements will readily occur to those skilled in the art.

In particular, the described embodiments are not limited to the example of diagnosis circuit described in relation with FIG. 3. It will be within the abilities of those skilled in the art to provide other embodiments of diagnosis circuit BIST enabling to implement the desired operation.

Further, the described embodiments are not limited to the specific examples of elementary conversion cells illustrated in FIGS. 1, 2, and 4. More generally, the described embodiments apply to any type of elementary DC/DC conversion cell comprising at least one switch and one passive power storage element, for example, a capacitor or an inductance. As an example, the elementary cells may be capacitive charge pump cells carrying out a division or a multiplication of the input voltage. As a variation, the elementary conversion cells may be inductive conversion cells. Further, the described embodiments are not limited to the specific case where the switches of the elementary conversion cells are MOS transistors.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A DC/DC converter comprising:
a plurality of conversion cells connected in parallel and/or in series, each cell comprising at least one switch and at least one passive power storage element;
a diagnosis circuit configured to individually test the cells to detect possible detective cells, to deactivate the detective cells, and to store the location of the defective cells; and
a general control circuit capable, when cells are deactivated by the diagnosis circuit, of reconfiguring control sequences applied to the switches of the cells which are still active,
wherein:
each cell comprises an internal circuit for controlling said at least one switch of the cell, configured to apply to said at least one switch a control sequence that depends on a parameterizing signal provided to the internal control circuit of the cell by the general control circuit of the converter;
the general control circuit is configured to define a plurality of elementary groups each comprising a plurality of neighboring elementary cells, and to apply to the elementary cells of a same group different parameterizing signals so that all the elementary cells in the group cooperate to implement a determined DC/DC conversion function; and
the general control circuit is configured, when defective cells are deactivated by the diagnosis circuit, to reconfigure the parameterizing signals applied to the internal control circuits of the cells which are still active so as to redefine the elementary groups of the converter.

2. The converter of claim 1, wherein, to test a cell, the diagnosis circuit measures the cell output voltage and compares it with an expected output voltage.

3. The converter of claim 1, wherein, to test a cell, the diagnosis circuit measures the conversion efficiency of the cell and compares it, with an expected conversion efficiency.

4. The converter of claim 1, wherein, to test a cell, the diagnosis circuit measures the output oscillation rate of the cell and compares it with an expected output oscillation rate.

5. The converter of claim 1, wherein, in each cell, the internal circuit for controlling said at least one switch of the cell is being rated by a clock signal provided by the circuit for generally controlling the converter.

6. The converter of claim 5, wherein the clock signals applied to the internal control circuits of the different cells are phase-shifted.

7. The converter of claim 6, wherein the general control circuit is configured, when defective cells are deactivated by the diagnosis circuit, to reconfigure the phase shifts of the clock signals applied to the internal control circuits of the cells which are still active.

8. The converter of claim 1, wherein the diagnosis circuit comprises a non-volatile memory.

9. The converter of claim 1, wherein said at least one power storage element is a capacitor or an inductance.

10. The converter of claim 1, wherein said at least one switch is a MOS transistor.

11. The converter of claim 1, wherein each cell comprises a capacitive charge pump.

12. The converter of claim 1, wherein said cells and said diagnosis circuit are integrated in a same semiconductor chip.

* * * * *